Patented Oct. 25, 1932

1,884,901

UNITED STATES PATENT OFFICE

GUILFORD L. SPENCER, DECEASED, LATE OF BROOKSVILLE, MAINE, BY EMMA F. SPENCER, EXECUTRIX, OF BROOKSVILLE, MAINE, ASSIGNOR TO CUBAN-AMERICAN SUGAR COMPANY, OF NEW YORK, N. Y., A CORPORATION OF NEW JERSEY

PROCESS FOR EXTRACTING SUGAR FROM CANE MOLASSES CONTAINING GLUCOSE

No Drawing.   Application filed October 17, 1929.   Serial No. 400,460.

This invention relates to a process for extracting sugar from cane molasses containing glucose. In accordance with the invention, the molasses is treated with a barium precipitant in sufficient quantity to impart a strong alkalinity to the solution after the barium has reacted with the sugar and with the glucose in the solution. This strong alkalinity has been found to be necessary for the successful extraction of sugar from molasses containing glucose.

A further feature of the invention consists in a process for the recovery of the excess barium used.

A specific example of the invention consists in adding tribasic barium silicate to molasses which has been diluted with water, adding the silicate in sufficient quantity for a part of its barium to combine with the sucrose as a saccharate, whereas another part forms more or less complex combinations with the impurities and decomposition products of the glucose, also another part is carried on through the process in the form of monobasic barium silicate and the remainder continues in solution, imparting strong alkalinity to the mixture. The reaction takes place at ordinary temperatures, but more rapidly and with larger and desirable decomposition of glucose at temperatures above 60° C. and preferably at a temperature near the boiling point of the mixture. The composition of the molasses, especially as regards sucrose, glucose, and water content largely determines the amount of water and barium salt needed, but a considerable and indeterminate quantity of the barium salt is also required to provide the alkalinity necessary. A typical sugar cane molasses of the analysis stated farther on, would require the indicated quantities of re-agents. The requirements for any cane molasses would vary little from those of this material whose analysis follows:—

| | Per cent |
|---|---|
| Water, by drying | 20 |
| Sucrose, by Clerget method | 38 |
| Glucose | 15 |
| Ash | 11 |
| Undetermined, by difference | 16 |
| Total | 100 |

One hundred parts of molasses of this, or approximately this, composition, would require the equivalent of about 90 parts of crystallized barium hydroxide as tribasic barium silicate of about 85% purity, to decompose the glucose, precipitate the sucrose, combine with the decomposition products of the glucose and organates and with the impurities. The barium tribasic silicate yields two-thirds of its barium as the hydroxide on treatment with water, hence the requirement of this salt of the purity stated would be about 87 parts. The water requirement is met partly by the water of the molasses itself. To complete this and provide sufficient fluidity of the mixture, 50 parts of water or a little more, is required, which is supplied largely by the saccharate washings. Part of the water is added to the molasses to reduce its viscosity. The barium trisilicate is added to the remainder of the water in a mixer and this is heated to near boiling and the molasses is then added gradually, with stirring.

The glucose is decomposed and the saccharate of barium soon precipitates, also some of the impurities and decomposition products precipitate as barium salts and one-third of the total barium is converted into the monosilicate and is precipitated. These precipitates are collected on a filter and washed with water containing two per cent of barium hydroxide in solution, with separation of the mother liquor or lye from the washings. The washings may be returned to the saccharate mixer to reduce sucrose losses and economize water, and the mother liquor is separately treated with sulphurous acid for the recovery of the barium as sulphite. The washed precipitates may be treated by known methods to dissolve out the sugar and recover the barium.

The barium sulphite obtained by the treatment of the mother liquor with sulphurous acid may be used in regenerating a barium precipitant. The extraction of the excess barium from the mother liquor by means of the sulphurous acid is very complete, and therefore makes it economically possible to use the large excess of the barium precipitant required to give the necessary alkalinity to the solution.

What is claimed is:

A method of extracting sugar from cane molasses containing glucose, which consists in adding to the molasses a solution of barium hydroxide sufficient in quantity to maintain the solution strongly alkaline after a part of the barium has precipitated the sugar as barium saccharate and another part of the barium has reacted with the glucose.

In testimony whereof I have hereunto set my hand.

EMMA F. SPENCER,
*Executrix of the Last Will and Testament of Guilford L. Spencer, Deceased.*